United States Patent
Kirby et al.

(10) Patent No.: US 6,226,615 B1
(45) Date of Patent: May 1, 2001

(54) SPOKEN TEXT DISPLAY METHOD AND APPARATUS, FOR USE IN GENERATING TELEVISION SIGNALS

(75) Inventors: David Graham Kirby, Surrey; Neil Dormand, Buckinghamshire, both of (GB)

(73) Assignee: British Broadcasting Corporation (GB)

( * ) Notice: Subject to any disclaimer, the term of this patent is extended or adjusted under 35 U.S.C. 154(b) by 0 days.

(21) Appl. No.: 09/128,180

(22) Filed: Aug. 3, 1998

(30) Foreign Application Priority Data

Aug. 6, 1997 (GB) .................................................. 9716690

(51) Int. Cl.⁷ .................................................. G01L 15/22
(52) U.S. Cl. .......................................... 704/272; 704/275
(58) Field of Search ..................................... 704/272, 270, 704/275, 231, 235, 251

(56) References Cited

U.S. PATENT DOCUMENTS

| | | | | |
|---|---|---|---|---|
| 3,972,603 | * | 8/1976 | Lubinec | 40/457 |
| 4,472,833 | * | 9/1984 | Turrell et al. | 381/56 |
| 4,894,722 | * | 1/1990 | Suzuki | 348/722 |
| 5,477,282 | * | 12/1995 | Moore | 352/4 |
| 5,799,273 | * | 8/1998 | Mitchell et al. | 704/235 |
| 6,064,961 | * | 5/2000 | Hanson | 704/260 |

FOREIGN PATENT DOCUMENTS

| | | | | |
|---|---|---|---|---|
| 0 262 938 | | 4/1988 | (EP) | 15/38 |
| 0649144 A1 | * | 4/1995 | (EP) | G11B/27/28 |
| 0 649 144 | | 4/1995 | (EP) | 27/28 |
| 08-056296 | | 2/1996 | (JP) | 5/222 |
| 09065176 | * | 3/1997 | (JP) | H04N/5/222 |
| WO 90/01203 | | 2/1990 | (WO) | 19/6 |
| WO 94/10666 | | 5/1994 | (WO) | 19/4 |

OTHER PUBLICATIONS

Global Telecommunication Conference 1988. Globecom '88. Bazzani et al., "PC–Based telephone communication system for deaf–blind people". Pp. 43–47 vol. 1. Dec. 1988.*

"Open–Vocabulary Speech Indexing for Voice and Video Mail Retrieval", M.G. Brown et al, ACM Multimedia 96, Boston MA USA, pp. 307–331.

"A Fast Lattice–Based Approach to Vocabulary Independent Wordspotting", D.A. James and S.J. Young, Proceedings of the International Conference on Acoustics, Speed and Signal Processing, ICASSP 94, vol. 1, pp. 377–380, Adelaide, IEEE.

* cited by examiner

*Primary Examiner*—Richemond Dorvil
(74) *Attorney, Agent, or Firm*—Dick & Harris

(57) ABSTRACT

Text to be spoken by a speaker, e.g. a newsreader, and held in a store, is displayed on a display which is seen by the speaker through a partially-reflecting mirror 16 mounted in front of a television camera. The text is scrolled up as the speaker speaks, this being achieved automatically by a controller. The controller recognizes the spoken speech picked up by a microphone, using speech recognition techniques, and matches the spoken text with the stored text to be spoken. The speed at which the text is spoken is thus determined and used by positioning circuit to adjust the rate at which the text scrolls up on the display. If the speech recognition fails, the text continues to be changed at a rate dependent upon the previous rate of change.

23 Claims, 2 Drawing Sheets

SPOKEN TEXT DISPLAY METHOD AND APPARATUS, FOR USE IN GENERATING TELEVISION SIGNALS

BACKGROUND OF THE INVENTION

The invention relates to a method of displaying text to be spoken by a speaker, and to apparatus for such display. Such a system can be used in a television studio to generate a television signal.

When a person is delivering a speech from a previously prepared script, for example a newsreader in a televised news broadcast or someone addressing a conference audience, a visual prompting system is frequently used. This presents the words to the speaker within their natural line of sight by using partially-reflecting mirrors appropriately positioned, for example, across the lens of a television camera. FIG. 1 shows a perspective view of a typical arrangement currently used in a television studio whilst FIG. 2 is a side view showing how the partially-reflecting mirror allows the speaker to read the projected text of the script whilst looking into the lens of the television camera.

In the system 100 of FIGS. 1 and 2, a newsreader 112 is seated before a television camera 114. The television camera is provided with a partially-reflecting mirror 116 over the camera lens, inclined at 45° to the horizontal and leaning away from the camera towards the newsreader. Below the partially-reflecting mirror 116 is positioned a text display device 118, for example a computer monitor in the form of a cathode ray tube display device. Text displayed on the display device 118 can be seen by the newsreader 112 as, being in the camera lens, it is in the line of sight of the newsreader. Just a few words can be displayed in this way; FIG. 1 shows the display of the words "The incident was seen". The display is driven by a suitable computer, for example based on a standard personal computer.

This arrangement allows the presenter to see the next few words of the script. An operator controls the scrolling of the projected text smoothly upwards to match the spoken delivery made by the presenter. In this way the presenter is able to read from the text without looking away from the camera.

Whilst this works very effectively, it requires an operator to control the scrolling of the text in time with the speaker.

International Patent Application WO-A-90/01203 describes a system using speech recognition in conjunction with a display, as part of a language training system to train a student to speak a foreign language. The quality of the speech is indicated to the user, and then the system moves on to new text. In International Patent Application WO-A-94/10666 is described a children's speech training aid which compares a child's speech with stored models of speech, and gives an indication of whether or not the child has spoken correctly. Finally, European Patent Application EP-A-0 649 144 describes a method of automatically indexing recorded audio using speech recognition, for use in aligning text stored in computer files and a recording. The system using indexing is complicated and would be difficult to operate in real time.

SUMMARY OF THE INVENTION

The invention in its various aspects is defined in the independent claims below. Advantageous features are set forth in the appendant claims.

A preferred embodiment of the invention is described in more detail below with reference to the drawings. In this embodiment, text to be spoken by a speaker, e.g. a newsreader, and held in a store, is displayed on a display which is seen by the speaker through a partially-reflecting mirror mounted in front of a television camera, which is operating to produce a live television signal for broadcasting. The text is scrolled up as the speaker speaks, this being achieved automatically by a controller. The controller recognises the spoken speech picked up by a microphone, using speech recognition techniques, and matches the spoken text with the stored text to be spoken. The speed at which the text is spoken is thus determined and used by the controller to adjust the rate at which the text scrolls up on the display. The system can be used in live broadcasts.

Preferably, if the speech recognition fails, the text continues to be changed at a rate dependent upon the previous rate of change.

BRIEF DESCRIPTION OF THE DRAWINGS

The invention will now be described in more detail, by way of example, with reference to the drawings, in which.

DETAILED DESCRIPTION OF THE PREFERRED EMBODIMENT

Figure 1:
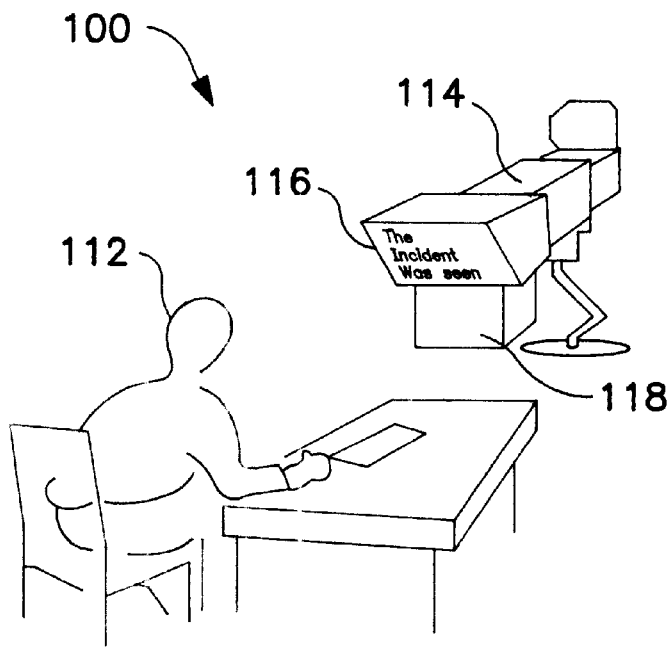
FIG. 1 (described above) is a perspective view of a conventional spoken text display system.
Figure 2:
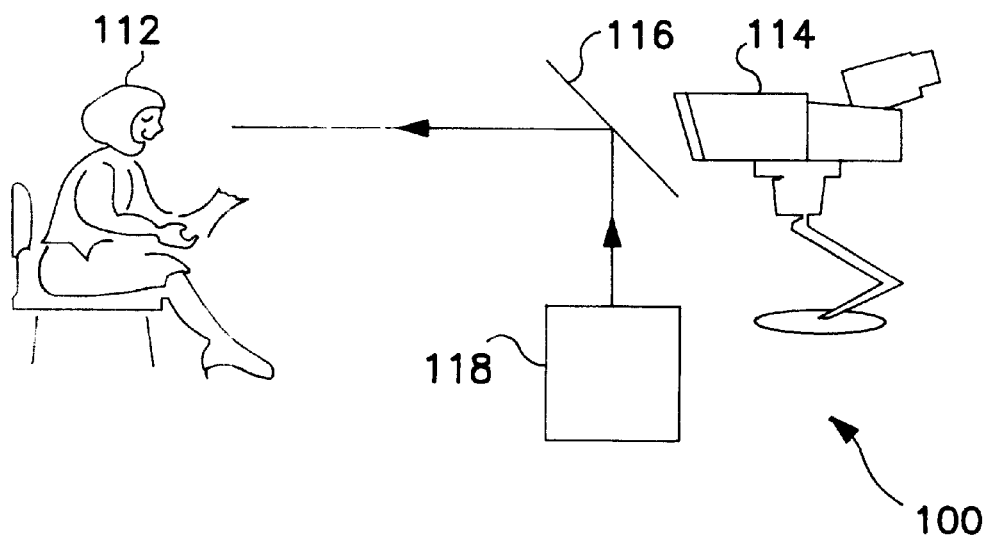
FIG. 2 (described above) is a diagrammatic side view of the system of FIG. 1.
Figure 3:
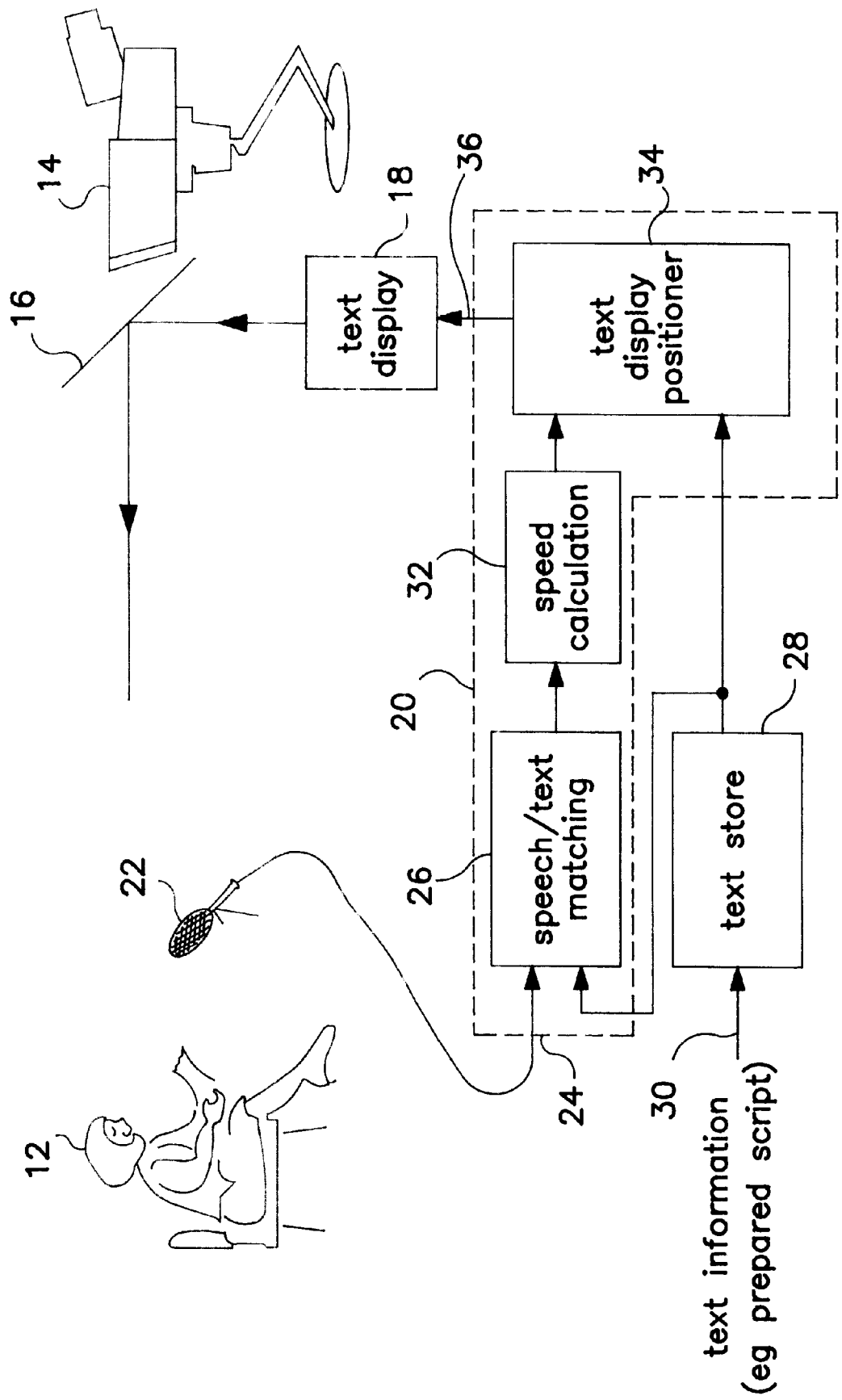
FIG. 3 is a diagrammatic illustration of a spoken text display system embodying the invention used to prompt a newsreader.

The prompting system illustrated uses computer-based speech recognition to identify the words spoken by the presenter and hence control the scrolling of the text presented to him or her. FIG. 3 shows the newsreader 12, television camera 14, partially-reflecting mirror 16 and text display device 18 corresponding to those shown in FIGS. 1 and 2. In this case, instead of the scrolling of the display being controlled manually by an operator, it is controlled automatically by a controller 20.

The controller 20 receives the output of the studio microphone 22 at an input 24 and thus receives a signal representing the newsreader's speech. While, as shown, the same microphone is used as is used to provide the transmitted audio signal, a separate microphone could be employed. In principle, other methods of generating a signal representative of the speech could be used, such as computer analysis of the newsreader's lip movements as seen by the camera 14.

In any event, the electrical signal representative of the speech is applied to a speech/text matching unit 26, which uses known speech recognition techniques to recognise the words being spoken and match them with the text being displayed. The text to be displayed is held in a store 28, having been previously entered into the store 28 via an input 30. A speed calculation circuit 32 determines from the output of the matching unit 26 the speed at which the text is being spoken, in terms of words per second or lines per second or some other convenient measure of speed. The speed calculation circuit 32 is connected to a text display positioning circuit 34 which applies text from the store 28 to the display 18, by smoothly scrolling the text up the display at a rate controlled by the output of circuit 32. In this way the displayed text keeps in step with the newsreader. As an alternative to scrolling the text, the display may display successive frames each consisting of a few words, possibly with overlap between frames.

The system is used as follows. Prior to the broadcast, the text of the script is prepared and transferred into the prompting system, as it would be with the existing equipment. The first words of the script are then displayed ready for the presenter to start speaking. At the same time, the text is stored by the speech matching system in the store 28. When the presenter subsequently speaks, this is detected and the speech/text matching unit 26 analyses the speech content and searches the displayed text for the words corresponding to those just spoken. As the presenter continues to read from the script, the speech recognition system analyses these subsequent words and continues to match these with the words expected from the displayed text. As this proceeds, the current speed of verbal delivery is determined from the timing between the words. This information is passed to the speed calculation circuit 32 which, by taking into account the length of each word, determines the most appropriate speed for the scrolling of the text displayed to the presenter. This information is then passed to the text positioning circuit 34 to move the text appropriately on the presenter's display.

When the presenter stops, the speech recogniser detects silence and stops the scrolling of the text. When the presenter resumes, the speech recogniser again identifies the spoken words, locates their position amongst those displayed, and calculates an appropriate speed for the scrolling text.

It will be appreciated that the television camera 14 is operating throughout, and the equipment can thus be used to generate a television signal in live broadcasting.

The requirements of the speech recognition unit 26 in this application can be simplified because the words being spoken are, under most circumstances, contained within the small number of words, typically less than ten, displayed to the presenter at any moment. Thus the speech recognition system does not need to identify the spoken utterance from a large vocabulary but can be arranged to look for only a very restricted subset of that vocabulary. The operation performed by the speech recogniser can thus be considered as matching the spoken utterances to the displayed text rather than full recognition of the words. This could be achieved using acoustic features of the speech. This simpler process can be carried out more quickly than unconstrained recognition of the utterances and is similar to the word spotting process as outlined in "Open Vocabulary Speech Indexing for Voice and Video Mail Retrieval" by M. G. Brown, J. T. Foote, G. J. F. Jones, K. Sparck Jones and S. J. Young (in Proceedings of the ACM Multimedia Conference 1996). A more detailed description of one method of performing the required matching of speech and text is given in "A Fast Lattice-based Approach to Vocabulary Independent Wordspotting" by D. A. James and S. J. Young, (in Proceedings of the International Conference on Acoustics, Speech and Signal Processing, ICASSP 94, Volume 1, pages 377 to 380, Adelaide, IEEE).

Some provision is desirably made for errors in the speech recognition, for words which are not in the recogniser's vocabulary, or for the presenter not saying the intended words. If speech recognition fails, providing speech is still detected, the scrolling text continues at its previous rate, but this rate can be adjusted by predicting the spoken duration of each word from its length in the text. Simultaneously, a wider range of text within the script is searched by the recognition process to determine a new match between text and speech, in order to try and regain synchronisation. If speech is no longer detected, then movement stops. Where recognition continues to be unreliable for a predetermined duration, a warning condition can be raised and an operator can intervene.

While the system has been described in terms of a hardware implementation, much of the system can alternatively be implemented in software, in which case FIG. 3 should be regarded as an information flow chart rather than a hardware diagram. The description has been given in terms of television signals for broadcast purposes. However the invention is not limited thereto and may be used for radio broadcasting, or for the generation of television signals, that is sound and vision signals, for local display such as in a presentation or the like.

What is claimed is:

1. A method of displaying text to be spoken by a speaker, said method comprising the steps of:
   holding text to be spoken in a store;
   visually displaying a portion of text from said store in the field of view of said speaker; and
   changing said portion of text which is displayed as said speaker speaks so as to proceed through said stored text in step with said speaker's speech;
   in which said text is changed automatically by:
      receiving an electrical input signal representative of said speech spoken by said speaker;
      recognising words spoken by said speaker and matching them with said stored text; and
      controlling said displayed text portion in accordance therewith so as to display text being spoken or about to be spoken by said speaker.

2. A method according to claim 1, in which said displayed text is seen by said speaker after reflection in a mirror.

3. A method according to claim 2, in which said mirror is a partially-reflecting mirror.

4. A method according to claim 3, in which said mirror is mounted in front of a camera.

5. A method according to claim 1, in which said electrical input signal is derived from a microphone.

6. A method according to claim 1, in which said recognising step comprises recognising words spoken by said speaker by reference to a restricted vocabulary based substantially only on words in said stored text.

7. A method according to claim 1, in which said controlling step comprises calculating the speed at which said speaker is speaking, and controlling the rate at which said text from said store is displayed in accordance therewith.

8. A method according to claim 1, in which, if said recognising step fails, said text continues to be changed at a rate dependent upon the previous rate of change.

9. The method according to claim 1, in which said recognizing step comprises recognizing words spoken by said speaker by reference to a restricted vocabulary based substantially only on words in said displayed text.

10. Apparatus for displaying text to be spoken by a speaker, said apparatus comprising:
    a store for holding said text to be spoken;
    a display device for visually displaying a portion of text from said store in the field of view of said speaker; and
    control means for changing said portion of text which is displayed as said speaker speaks so as to proceed through said stored text in step with said speaker's speech;
    in which said control means changes said text automatically and comprises:
       receiving means for receiving an electrical input signal representative of said speech spoken by said speaker;
       recognising means connected to said receiving means and said store for recognising words spoken by said speaker and for matching them with said stored text; and
       controlling means connected to said recognising means for controlling said displayed text portion in accordance therewith so as to display text being spoken or about to be spoken by said speaker.

11. Apparatus according to claim 10, including a mirror in which said displayed text is seen by said speaker after reflection.

12. Apparatus according to claim 11, in which said mirror is a partially-reflecting mirror.

13. Apparatus according to claim 12, further comprising a camera, and in which said mirror is mounted in front of said camera.

14. Apparatus according to claim 10, including a microphone from which said electrical input signal is derived.

15. Apparatus according to claim 10, in which said controlling means comprises means for calculating the speed at which said speaker is speaking, and means for controlling the rate at which said text from said store is displayed in accordance therewith.

16. Apparatus according to claim 10, in which said recognising means comprises means for recognising words spoken by said speaker by reference to a restricted vocabulary based substantially only on said words in said stored text.

17. Apparatus according to claim 10, in which, if said recognising means fails to recognise said spoken words, said controlling means continues to change said text at a rate dependent upon the previous rate of change.

18. The apparatus according to claim 10, in which said recognizing means comprises recognizing words spoken by said speaker by reference to a restricted vocabulary based substantially only on words in said displayed text.

19. A method of generating a television signal, said television signal comprising speech representing text and video, said method comprising the steps of:

holding text to be spoken in a store;

visually displaying a portion of text from said store in the field of view of a speaker, said displayed text being seen by said speaker after reflection in a partially-reflecting mirror;

changing said portion of text which is displayed as said speaker speaks so as to proceed through said stored text in step with said speaker's speech; and simultaneously outputting a television signal from a television camera;

in which said text is changed automatically by:
receiving an electrical input signal representative of said speech spoken by said speaker;
recognising words spoken by said speaker and matching them with said stored text; and
controlling said displayed text portion in accordance therewith so as to display text being spoken or about to be spoken by said speaker.

20. A method according to claim 19, in which said recognising step comprises recognising words spoken by said speaker by reference to a restricted vocabulary based substantially only on words in said stored text.

21. A method according to claim 19, in which said controlling step comprises calculating the speed at which said speaker is speaking, and controlling the rate at which said text from said store is displayed in accordance therewith.

22. A method according to claim 19, in which, if said recognising step fails, said text continues to be changed at a rate dependent upon the previous rate of change.

23. The method according to claim 19, in which said recognizing step comprises recognizing words spoken by said speaker by reference to a restricted vocabulary based substantially only on words in said displayed text.

* * * * *